United States Patent [19]

Figi et al.

[11] Patent Number: 5,627,315

[45] Date of Patent: May 6, 1997

[54] ACCELEROMETER WITH A CANTILEVER BEAM FORMED AS PART OF THE HOUSING STRUCTURE

[75] Inventors: Bruce B. Figi, Davis; Thomas R. Giuffre, Freeport, both of Ill.

[73] Assignee: Honeywell Inc., Minneapolis, Minn.

[21] Appl. No.: 423,196

[22] Filed: Apr. 18, 1995

[51] Int. Cl.$^6$ .................................................. G01P 15/08
[52] U.S. Cl. ..................................... 73/514.31; 73/514.16
[58] Field of Search ........................... 73/514.31, DIG. 3, 73/514.16; 324/207.26, 207.21, 162

[56] References Cited

U.S. PATENT DOCUMENTS

| | | | |
|---|---|---|---|
| 4,321,464 | 3/1982 | Miller | 73/655 |
| 4,825,697 | 5/1989 | Huber | 73/514.31 |
| 4,849,655 | 7/1989 | Bennett | 73/514.31 |
| 4,870,864 | 10/1989 | Io | 73/514.31 |
| 4,967,598 | 11/1990 | Wakatsuki et al. | 73/DIG. 3 |
| 5,036,705 | 8/1991 | Gaines | 73/DIG. 3 |
| 5,220,834 | 6/1993 | Saito et al. | 73/514.31 |
| 5,359,286 | 10/1994 | Kaiser et al. | 73/514.31 |
| 5,373,740 | 12/1994 | Yoshida et al. | 73/514.13 |
| 5,400,654 | 3/1995 | Kaiser et al. | 73/514.31 |

Primary Examiner—Hezron E. Williams
Assistant Examiner—Helen C. Kwok
Attorney, Agent, or Firm—William D. Lanyi

[57] ABSTRACT

An accelerometer is provided in which a magnet structure is encapsulated within a distal end of a cantilever beam that is formed as an integral part of a housing structure. The cantilever beam, the distal end and the housing structure are formed of a nonmagnetic material, such as plastic, during a single injection molding procedure. The magnetic structure within the distal end of the cantilever beam can comprise two magnets associated with a pole piece and disposed within an opening formed in a nonmagnetic bracket. Although many types of magnet structures are possible within the scope of the present invention, a particularly preferred magnet structure comprises two magnets that are arranged in opposite polarity with the opposite poles of the two magnets being located adjacent to each other on opposite sides of a centerline. The magnet structure can be held in place during the injection molding process by the magnetic attraction between the magnet structure and a ferromagnetic portion of the mold. The magnetically sensitive component, which is held in place within a wall of the housing structure, can be a Hall effect element.

10 Claims, 12 Drawing Sheets

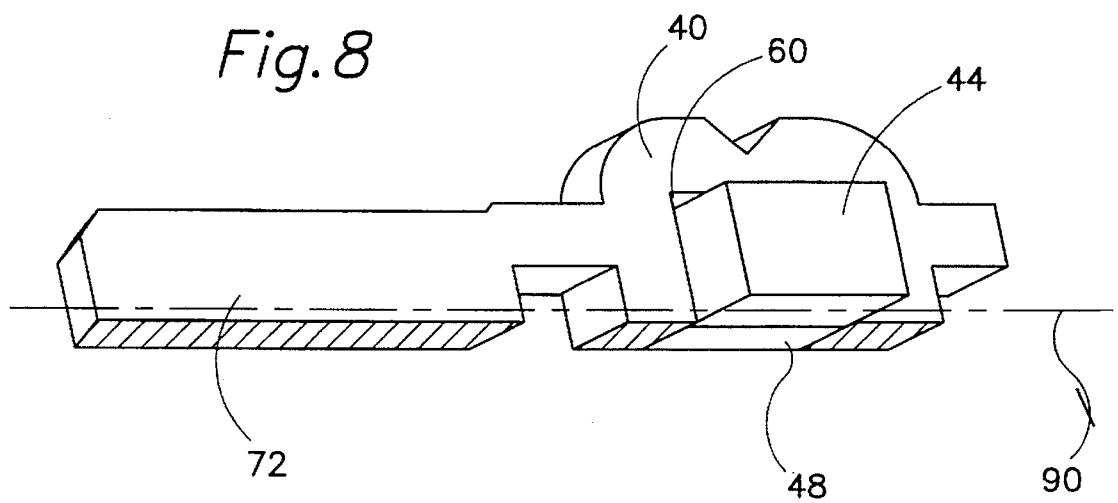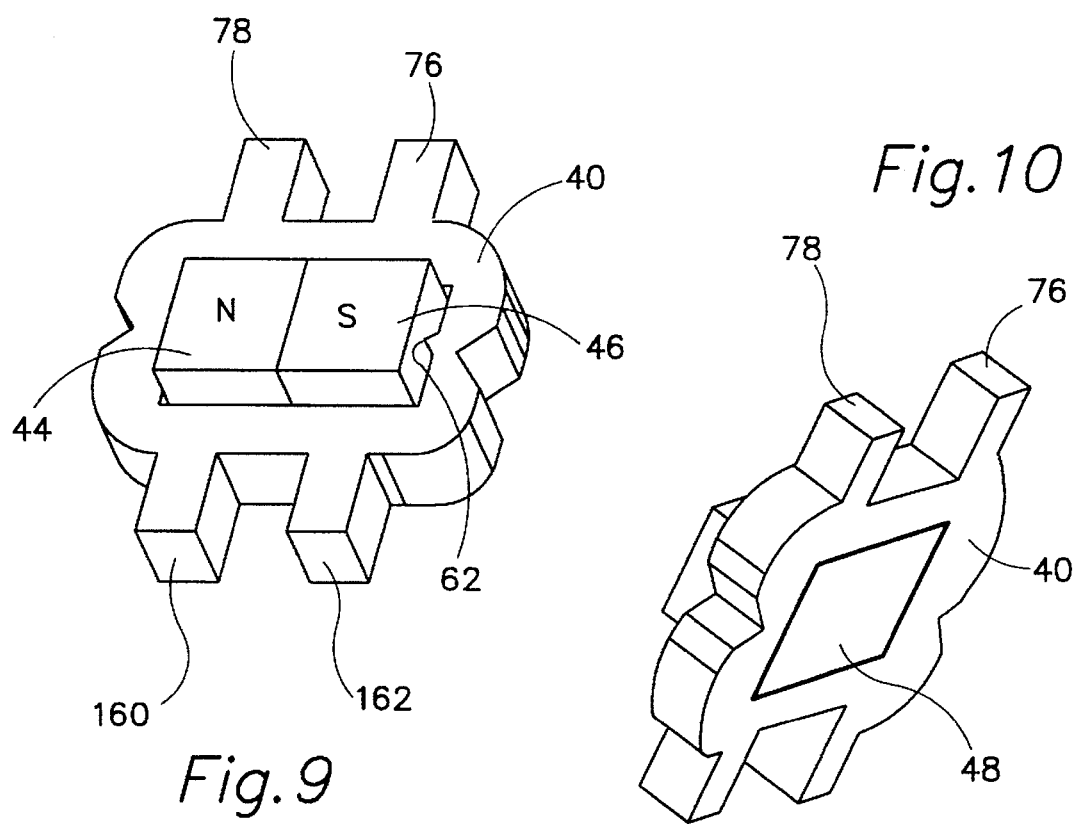

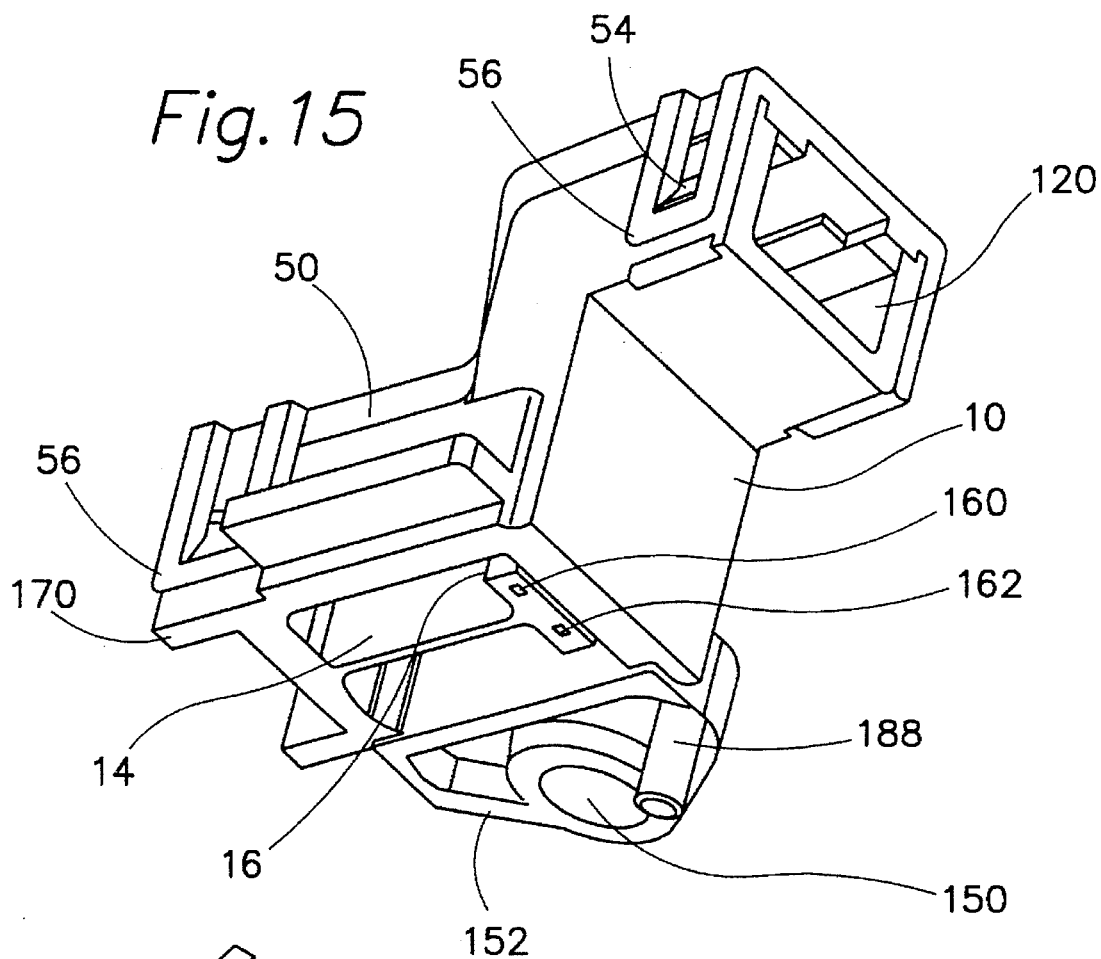

ACCELEROMETER WITH A CANTILEVER BEAM FORMED AS PART OF THE HOUSING STRUCTURE

BACKGROUND OF THE INVENTION

1. Field of the Invention

The present invention is generally related to an accelerometer and, more particularly, to an accelerometer in which a magnet structure is attached to a distal end of a cantilever beam that is formed as an integral part of a housing structure.

2. Description of the Prior Art

Many different types of accelerometers are known to those skilled in the art. U.S. Pat. No. 5,036,705, which issued to Gaines on Aug. 6, 1991, discloses an accelerometer that is damped with a self contained viscous material. It provides a damping arrangement for a deflectable beam accelerometer where the deflectable end of the beam is spaced from a stationary member. A drop of self contained viscous material extends between the deflectable end of the beam and the stationary member in order to dampen the movement of the deflectable end.

U.S. Pat. No. 4,321,464, which issued to Miller on Mar. 23, 1982, describes a device for measuring vibration phase and amplitude. The device is used for measuring vibration and comprises a vane that is attached to a vibratory member. A light supply is provided and at least one detector is used. The vane includes, or is attached to, a mask having a plurality of light directing and light opaque elements. During vibration, the mask travels transversely of the light path. The elements of the mask may be encoded, as with a Gray Code, so as to yield both amplitude and phase information. The elements may be so arranged as to chop the light into a plurality of pulses for each vibration of the vane through the use of a second stationary mass. In either case, the device yields information whose interpretation is substantially independent of fluctuations in the intensity of the source light.

U.S. Pat. No. 4,967,598, which issued to Wakatsuki et al on Nov. 6, 1990, describes an acceleration sensor that includes an cantilever beam having a free end to which a permanent magnet is attached. A pair of magnetic sensors, each comprising a barber-pole type magnetoresistive sensing element, is arranged in symmetrically spaced and opposed relationship and in a common plane extending parallel to the magnetic flux of the permanent magnet with respect to opposite sides of the magnet. The cantilever is bent and the magnet is moved accordingly in response to an acceleration force, which is detected as outputs from the magnetoresistive sensing elements.

U.S. patent application Ser. No. 08/142,753 (M40-15406), which was filed on Oct. 25, 1993 by Henrion and assigned to the assignee of the present application, describes an accelerometer that is provided with a proof mass attached to a movable plate that is rotatable about an axis that lies in the plane of a silicon substrate. The first and second portions of a movable conductor are provided on the rotatable plate and first and second stationary conductors are disposed in association with the first and second portions in order to provide two capacitors. The capacitors can be used to measure the rotational movement of the movable conductor and can also be used to create electromotor force to force rebalance the plate in response to acceleration forces exerted on the center of mass of the proof mass. The proof mass is displaced above the rotational plate and therefore is responsive to accelerations in a direction parallel to the plane of the substrate and of the rotatable plate. This permits two accelerometers to be simultaneously manufactured in a single silicon substrate in order to measure accelerations in two perpendicular directions, wherein both of the directions lie in the plane of the substrate. Acceleration forces on the proof mass cause the movable plate to rotate about its support axis and change the capacitance effect of both capacitors. Alternative embodiments of the accelerometer can utilize piezoresistors disposed on the support arms instead of relying solely on the capacitor techniques described above.

Many accelerometers known to those skilled in the art require costly assembly procedures which increase the cost of the accelerometer and therefore inhibit its use in many applications which do not justify the inclusion of an expensive accelerometer. It would therefore be advantageous if an accelerometer could be developed which can be manufactured inexpensively while maintaining the ability to accurately determine the acceleration of a device to which the accelerometer is attached.

SUMMARY OF THE INVENTION

An accelerometer made in accordance with the present invention comprises a housing structure that has a cavity formed therein. A cantilever beam extends inwardly into the cavity from a first wall of the housing structure and a magnet structure is attached to a distal end of the cantilever beam. The distal end of the beam is movable along a first path in response to flexure of the cantilever beam. A magnetically sensitive component is attached to a second wall of the housing structure. The magnetically sensitive component is displaced from the magnet structure by a preselected distance and has an output signal which is representative of the position of the magnet structure relative to the magnetically sensitive component.

In a preferred embodiment of the present invention, the housing structure and the cantilever beam are formed as parts of a unitary structure. In addition, the magnet structure comprises two permanent magnets in a particularly preferred embodiment of the present invention and the two permanent magnets are disposed within a nonmagnetic bracket. The nonmagnetic bracket is encapsulated within the distal end of the cantilever beam. The magnet structure can additionally comprise a ferromagnetic pole piece that is disposed in magnetic flux directing association with the two permanent magnets.

In one particularly preferred embodiment of the present invention, a means is provided for locating the first and second permanent magnets at first and second positions, respectively, which are equally spaced on opposite sides of the centerline that is disposed at a preselected position relative to the magnetically sensitive component. In certain embodiments of the present invention, the bracket can be made of brass and the housing structure and cantilever beam can be made of plastic. In one embodiment of the present invention, the housing structure and the cantilever beam are formed as parts of a single plastic structure which is produced by a single injection molding process. Although many different types of plastics can be used in conjunction with the present invention, prototypes have been manufactured using a plastic called Ultem 1000 which is available from General Electric Plastics. Throughout the Description of the Preferred Embodiment, the present invention will be described as having a magnet structure which comprises two magnets. In a particularly preferred embodiment of the present invention, the two magnets are arranged in opposite polarity association with each other. In the Description of the Preferred Embodiment of the present invention, the two magnets are arranged in this opposite polarity configuration even though each reference to the magnet structure below does not specifically recite this polarity configuration. A lid structure is attached to the housing structure to enclose the cavity.

BRIEF DESCRIPTION OF THE DRAWINGS

The present invention will be more fully and completely understood from a reading of the Description of the Preferred Embodiment in conjunction with the drawings, in which:

FIG. 8 is a section view of a bracket with magnets and a pole piece disposed therein;

FIGS. 9 and 10 are two perspective views of a bracket used in accordance with the present invention;

FIGS. 14 and 15 are two perspective views of an accelerometer made in accordance with the present invention.

DESCRIPTION OF THE PREFERRED EMBODIMENT

Figure 1:
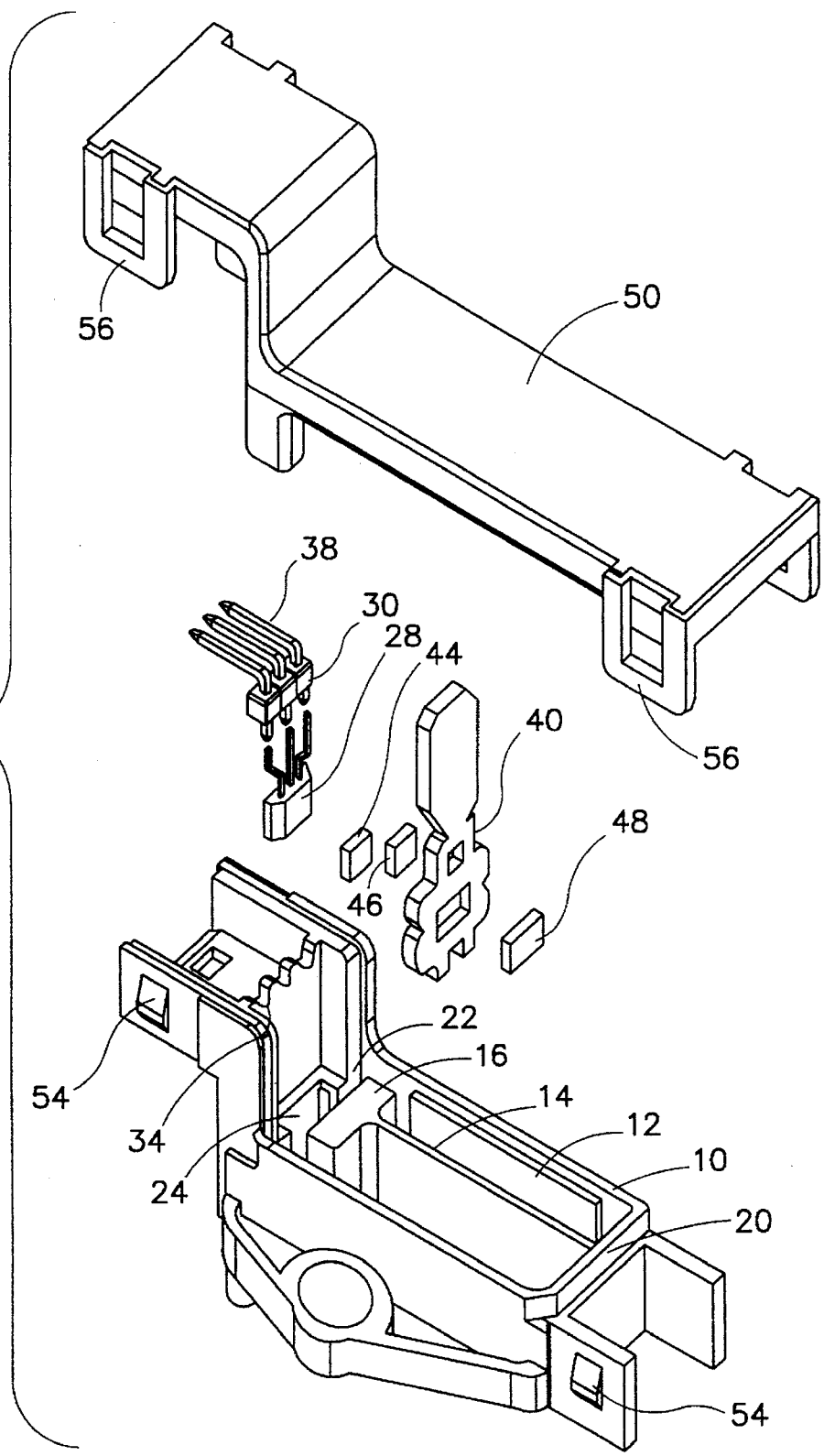
FIG. 1 is an exploded perspective view of an accelerometer made in accordance with the present invention.

Throughout the Description of the Preferred Embodiment, like components will be identified by like reference numerals. FIG. 1 is an exploded perspective view of the present invention. A housing structure 10 is provided with an internal cavity 12. A cantilever beam 14 is formed as part of the housing structure 10. The cantilever beam 14 is provided with a distal end 16. As shown in FIG. 1, the cantilever beam 14 is attached to a first wall 20 of the housing structure 10. A second wall 22 is provided with an opening 24 that is shaped to receive a magnetically sensitive component 28 within it. In a preferred embodiment of the present invention, the magnetically sensitive component 28 is a Hall effect element. However, it should be understood that alternative embodiments of the present invention could use alternative magnetically sensitive components. A lead frame 30 is attached in electrical communication with the leads of the magnetically sensitive component 28.

With continued reference to FIG. 1, several slots 34 are formed as part of the housing structure 10 and shaped to receive the leads 38 of the lead frame structure 30. As will be described in greater detail below, a bracket 40 is encapsulated within the distal end 16 of the cantilever beam 14. The bracket is shaped to receive first and second magnets, 44 and 46, and a pole piece 48 in a particularly preferred embodiment of the present invention. A lid structure 50 is shaped to be received by the housing structure in locking relationship therewith. The housing structure 10 is provided with lugs 54 and the lid structure 50 is provided with bails 56 which firmly attach the lid structure to the housing structure.

Figure 2:
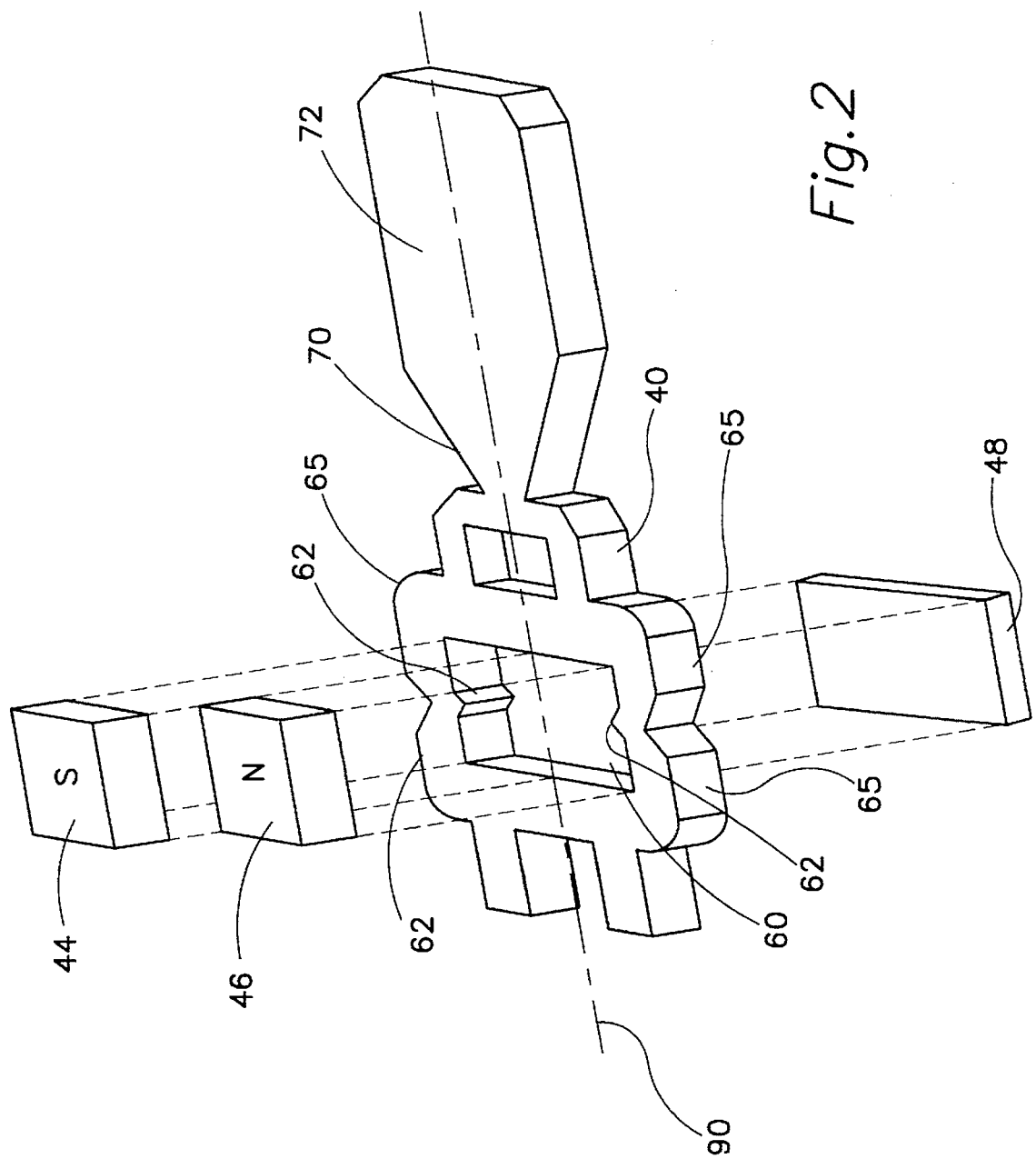
FIGS. 2 and 3 show alternative configurations of a bracket used in conjunction with the present invention.

FIG. 2 shows an exploded view of the bracket 40, the magnets, 44 and 46, and the pole piece 48. An opening 60 is formed in the bracket 40 and shaped to receive the magnets in a side by side association therein. The shape of the bracket 40 includes side surfaces 65 which define the width of the bracket structure. As will be described in greater detail below, these side surfaces 65 are used to locate the bracket within the injection molding machine in order to assure that the centerline 90 is properly aligned with the magnetically sensitive component 28. Therefore, the bracket 40 serves as a carrier for the magnets and the pole piece and also serves as a fixture for locating and containing the centerline of the two magnets during the overmolding operation. The nibs 62 are formed as protrusions from the walls of the opening 60 for the purpose of holding the magnets within the opening after they are initially inserted. The pole piece 48 is inserted into the opening 60 in order to complete a magnetic circuit with the first and second magnets. As shown in FIG. 2, the polarities of the upper faces of the magnets are identified for the purpose of illustrating the opposite polarity of the two magnets within the opening 60. In combination with the pole piece 48, a magnetic circuit is therefore formed in which the magnetic flux passes from one of the magnets, through the pole piece 48 and into the other magnet.

Figure 3:
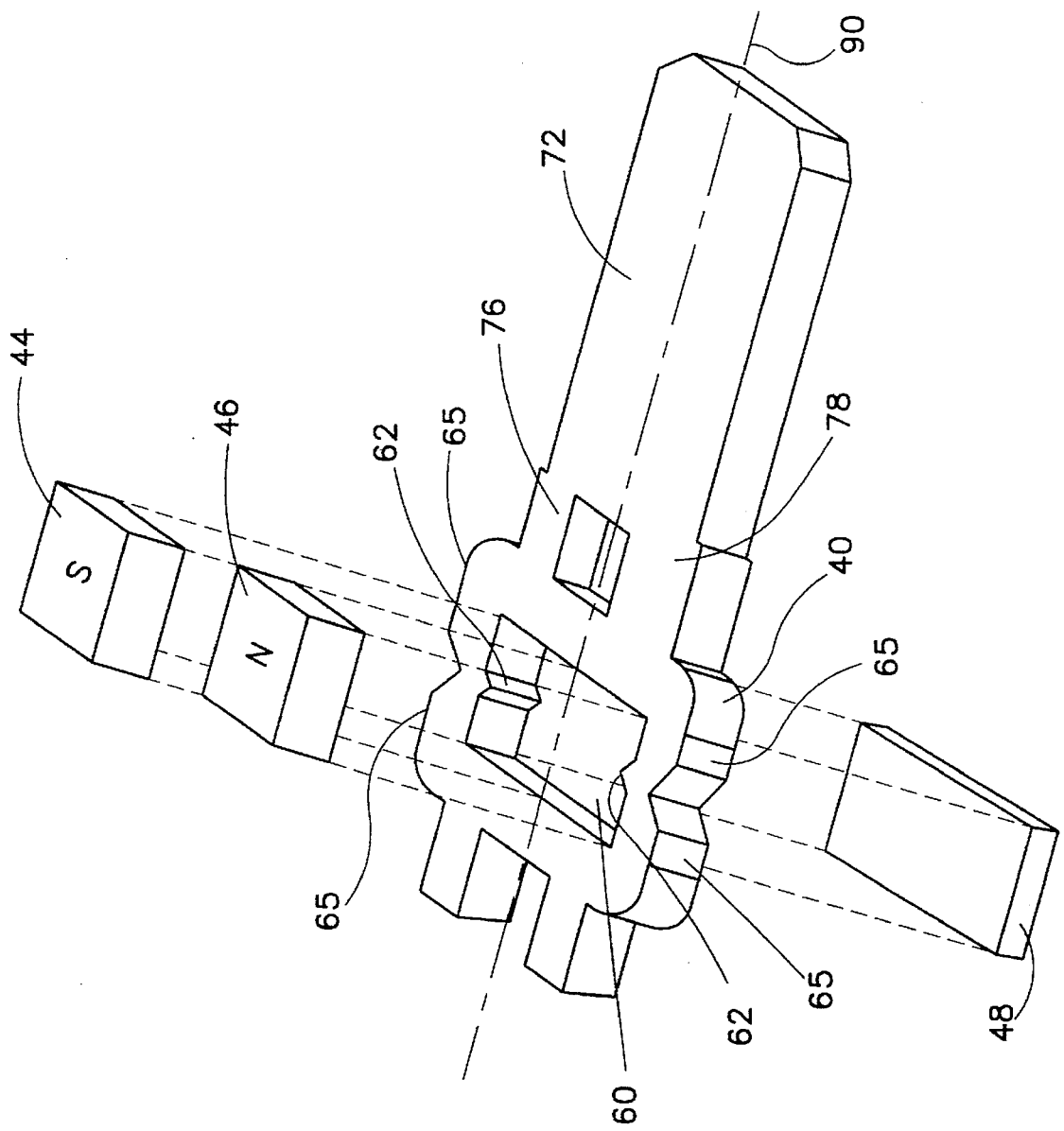

FIG. 3 shows an alternative configuration of the bracket 40. By comparing FIGS. 2 and 3, it can be seen that the primary difference between the two structures in FIGS. 2 and 3 is the reduced width of the bracket 40 in FIG. 2 at the location identified by reference numeral 70. This reduced dimension is provided in order to facilitate the removal of the extension 72 from the remaining portion of the bracket in which the magnets and pole piece are contained. In the structure shown in FIG. 3, the extension 72 could be removed from the remaining portion by severing the ribs identified by reference numerals 76 and 78. As will be described in greater detail below, one of the steps used in producing the accelerometer of the present invention comprises the removal of the extension 72 from the remaining part of the bracket. This removal can be accomplished in alternative ways and two possible structural configurations are illustrated in FIGS. 2 and 3. Throughout the Description of the Preferred Embodiment of the present invention, it should be understood that the shapes illustrated in FIGS. 2 and 3, or alternative configurations, are within the scope of the present invention. The two nibs 62 located in the opening 60 of the bracket 40 are used to control the centerline of the two magnets relative to the side surfaces 65 of the bracket. These nibs 62 help to eliminate a potential problem that would otherwise occur if the magnets are made with sides that are not perpendicular to each other. In other words, if the magnets are shaped in the form of a parallelogram, the magnets could possible interfere with the sides of the opening 60 in some corners while leaving a gap in other corners of the opening 60. Since the nibs 62 are deformable, they facilitate the holding of the magnets in position even though the dimensions of the magnets are intentionally selected to provide a clearance between the surfaces of the magnets and the internal walls of the opening 60.

Figure 4:
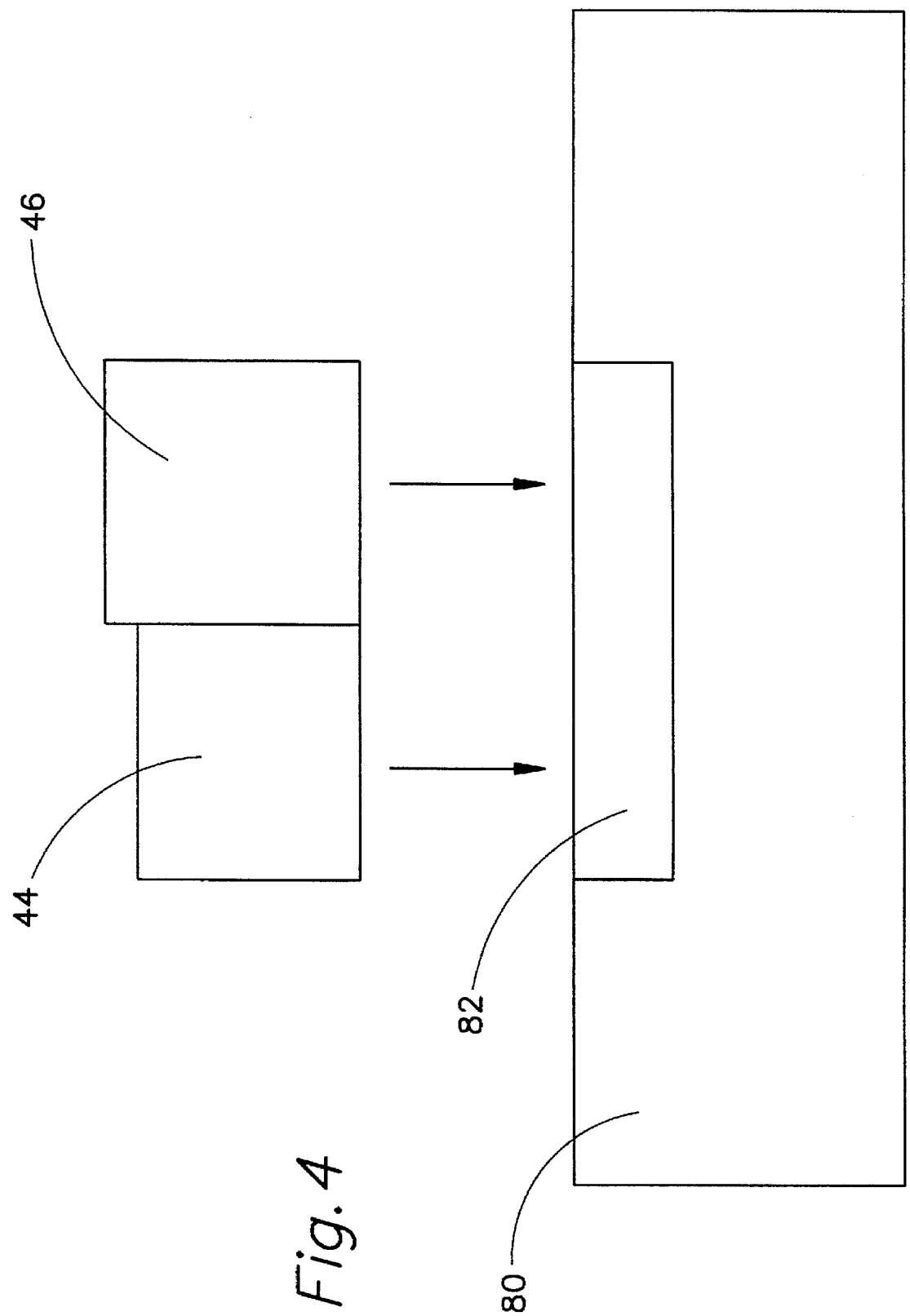
FIGS. 4, 5, 6 and 7 show progressive steps used to attach magnets and a pole piece in association with a bracket.

FIG. 4 illustrates one possible way of accurately assembling the magnets and the pole piece within the bracket 40. Although alternative procedures can be employed to accomplish this purpose, a preferred mechanism comprises a fixture 80 that has an opening 82 formed in one of its surfaces. The opening 82 is shaped to receive the two magnets, 44 and 46, within it in side by side relationship with each other. The two magnets are inserted into the opening 82 in the direction indicated by the arrows in FIG. 4. It should be noted that the two magnets, 44 and 46, are intentionally shown as having different thickness. Although this characteristic is not desirable in accelerometers made in accordance with the present invention, this difference in thickness is exaggerated intentionally in FIG. 4 so that a particular feature of the present invention can be described. That feature relates to its relative insensitivity to this type of thickness differential.

Figure 5:
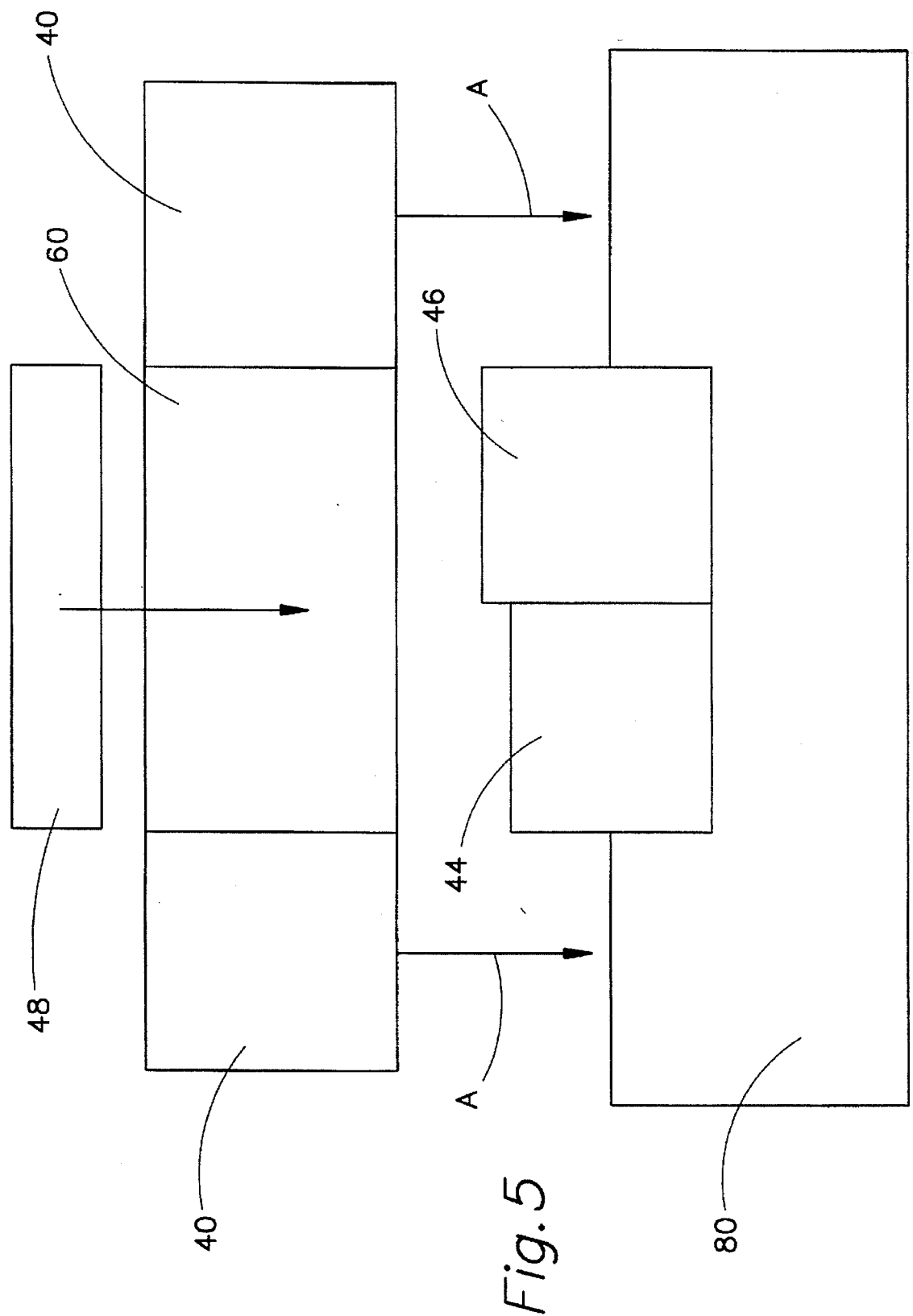

FIG. 5 shows the two magnets, 44 and 46, disposed within the opening of the fixture 80. The bracket 40 is then disposed around the magnets and the magnets are inserted into the opening 60 by moving the bracket 40 in the directions indicated by arrows A. Although not specifically shown in FIG. 5, it should be understood that the nibs 62 in the opening 60 are deformable so that the insertion of the magnets into the opening 60, in combination with the deformation of the nibs, will hold the magnets firmly within the opening 60. Also shown in FIG. 5 is the pole piece 48 and an arrow B indicating its eventual direction of movement when it is inserted into the opening 60.

Figure 6:
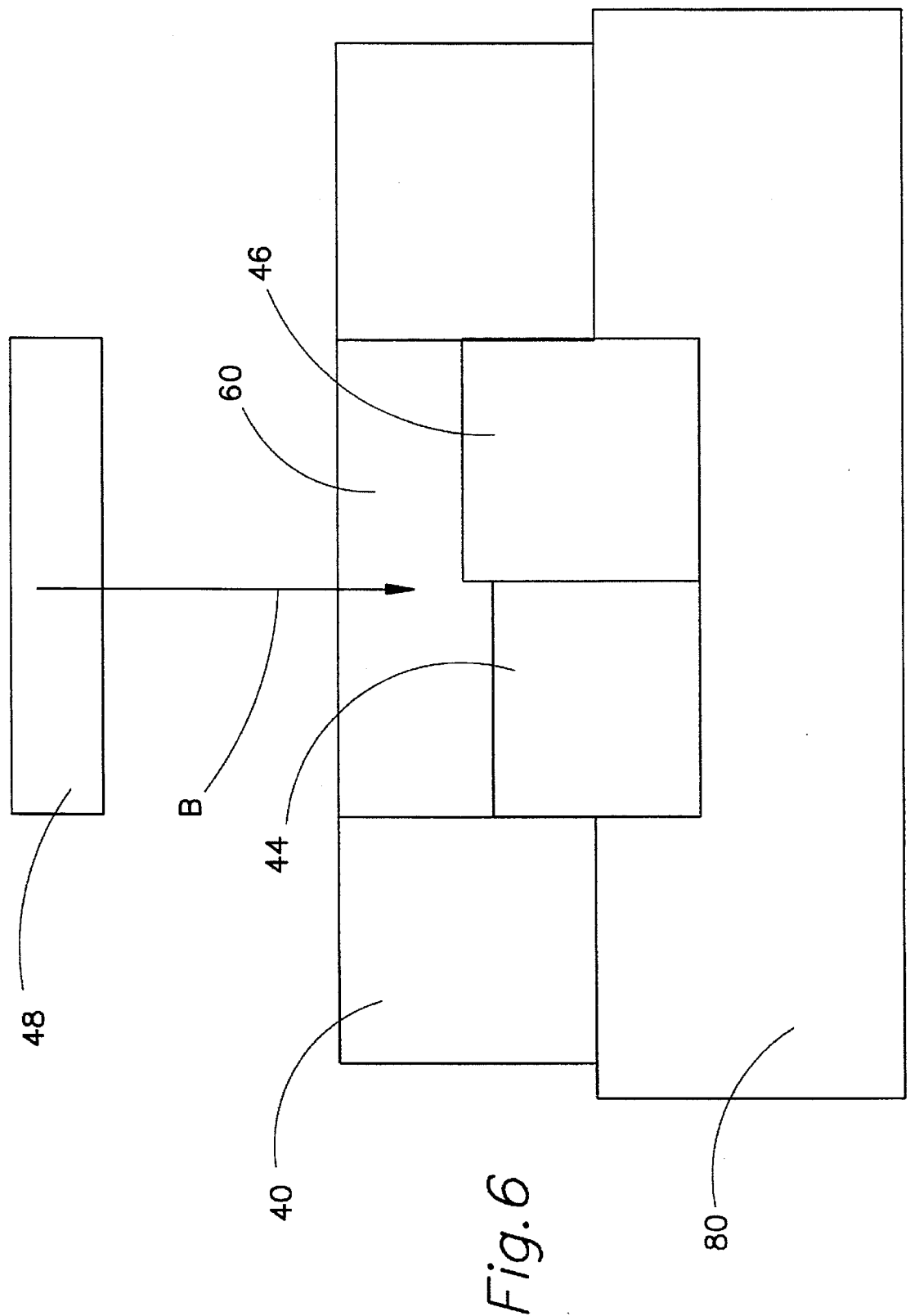

FIG. 6 shows the bracket 40 disposed around the magnets, 44 and 46. Prior to disposing the pole piece 48 into the opening 60 on top of the magnets, an appropriate glue or epoxy is deposited into the opening 60. This glue can be the type which is identified as cyanoacrylate (Loctite 498 adhesive) and which is available in commercial quantities from Loctite Corporation. However, it should be understood that alternative glues and epoxies can be used for this purpose. The glue maintains the magnets in rigid attachment with the bracket 40 and also maintains the pole piece 48 within the opening 60 above the magnets shown in FIG. 6. The glue is disposed within the opening 60 prior to the placement of the pole piece 48 in contact with the magnets.

Figure 7:
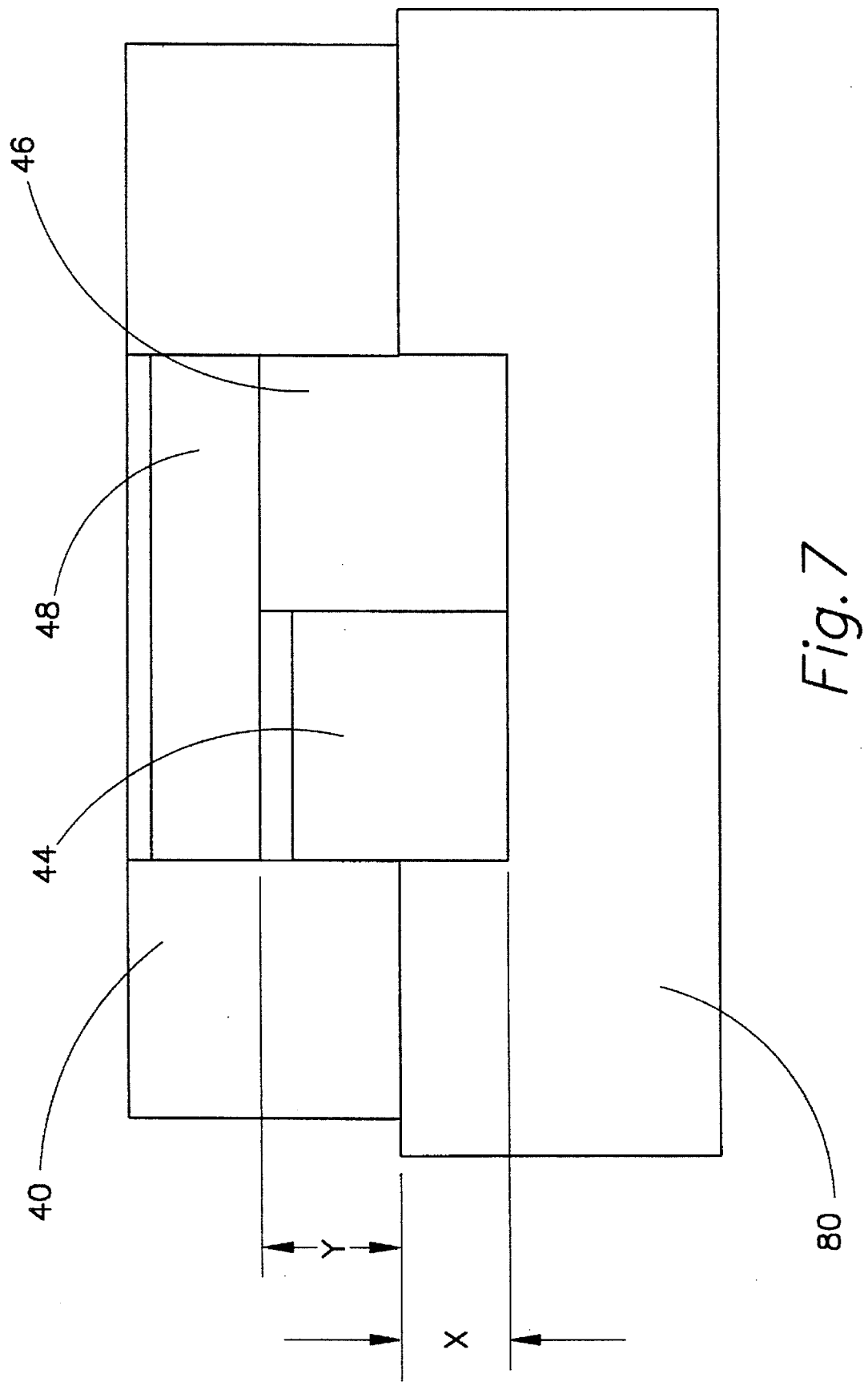

FIG. 7 shows the pole piece 48 disposed on top of the magnets, 44 and 46, within the opening 60 of the bracket 40. It should be understood that the difference in the thickness of the magnets is highly exaggerated in FIGS. 4-7 in order to demonstrate the fact that the operative faces of the magnets, which are directed downward in FIG. 7, are perfectly aligned within a common plane because of the technique used to insert the magnets and pole piece into the bracket 40 in association with the use of the fixture 80. In a particularly preferred embodiment of the present invention, the opening 82 in the fixture 80, shown in FIG. 4, has a depth which is less than the thickness of the magnets. To illustrate this, the depth of the opening in the fixture 80 is identified by dimension X in FIG. 7. The thickness of the magnets extend above the upper surface of the fixture 80 by a dimension Y. In one particularly preferred embodiment of the present invention, dimension X is approximately equal to 0.025 inches and dimension Y is equal to approximately 0.015 inches. The nominal thickness of the magnets, which is the sum of dimensions X and Y, is approximately 0.040 inches. The fixture is made of Delrin plastic in a preferred embodiment of the present invention, but it should be understood that alternative embodiments are also within its scope.

With continued reference to FIG. 7, it should be understood that a clearance is provided between the dimensions of the pole piece 48 and the dimensions of the opening 60 of the bracket 40. This clearance dimension allows the pole piece to be placed in intimate contact with both magnets. The pole piece 48 will seek a position in which it is in contact with both of the magnets. As a result of the procedures described above in conjunction with FIGS. 4-7, the pole piece 48 and the two magnets, 44 and 46, become rigidly attached within the opening 60 of the bracket 40.

FIG. 8 shows the results of this attachment. In FIG. 8, the bracket 40 is shown in sectioned view. One of the magnets 44 is illustrated extending upward from the face of the bracket 40. The pole piece 48 is also shown within the opening 60 of the bracket. In the view of FIG. 8, only one of the two magnets 44 is shown because the sectioned view of the bracket 40 is taken along a centerline 90 of the bracket. It is important to note that the surface of the magnet 44 that is in contact with the other magnet 46 (not shown in FIG. 8) is disposed along that centerline 90. That centerline 90, which is actually in a plane which cuts the bracket 40 to form the section shown in FIG. 8, is important to the operation of the present invention. As will be described in greater detail below, it is important to dispose the centerline 90 at a particular location relative to the magnetically sensitive component 28. Because of the manner in which the magnets are inserted into the opening 60 of the bracket 40, it is important that the dimensions of the magnets are accurately formed within an allowable range of tolerance. Since the location of the magnets is determined by the size of the opening 60 and the deformation of the nibs 62, the position of the contacting surfaces of the two magnets will be determined by the accuracy of their dimensions that extend perpendicularly to their contacting surfaces. Alternative arrangements are possible within the scope of the present invention to improve the accuracy of the location of the centerline 90. For example, the opening 60 can be formed with a central diaphragm extending along the centerline 90. When the two magnets are inserted into the two sides of the opening 60 on opposite sides of the diaphragm, they will be forced against opposite sides of the thin diaphragm by the action of the deformable nibs 62. Since the thickness of the diaphragm can be maintained with a relatively high degree of accuracy, the relative positions of the most proximate surfaces of the magnets will be accurately located. However, if a diaphragm is used in this manner, it should be understood that the most proximate surfaces of the magnets will be displaced from each other by the thickness of the diaphragm and will not be in direct contact with each other as described in the above discussion. An alternative method of positioning the centerline 90 accurately with respect to both the bracket 40 and the magnetically sensitive component 28 could comprise the provision of nondeformable protrusions extending from the walls of the opening 60 which are perpendicular to the walls from which the nibs 62 protrude. These additional protrusions could be used to locate the most proximate faces of the magnets for the purpose of accurately determining the location of the centerline 90.

It should be understood that the importance of the location of the centerline 90 relates to the fact that the opposite polarity of the two magnets causes an abrupt change in the direction of magnetic field at centerline 90 which extends between the two most proximate surfaces of the magnets. This change in magnetic flux direction is used in a preferred embodiment of the present invention to monitor the movement of the distal end 16 of the cantilever beam 14 as will be described in greater detail below.

FIGS. 9 and 10 show two perspective views of the bracket 40 following the removal of the extension 72. In FIGS. 9 and 10, the magnets are shown extending from the bracket 40 with their extending faces disposed in a common plane. The magnets, 44 and 46, are held in place by the two deformable nibs. The pole piece 48 is disposed within the opening of the bracket 40 in the manner described above. The magnets and the pole piece are held rigidly in place by the use of the glue described above in conjunction with FIGS. 6 and 7. With reference to FIGS. 8, 9 and 10, it should be understood that the removal of the extension 72 from the bracket 40 is performed after the bracket is encapsulated within the distal end 16 of the cantilever beam 14.

Figure 11:
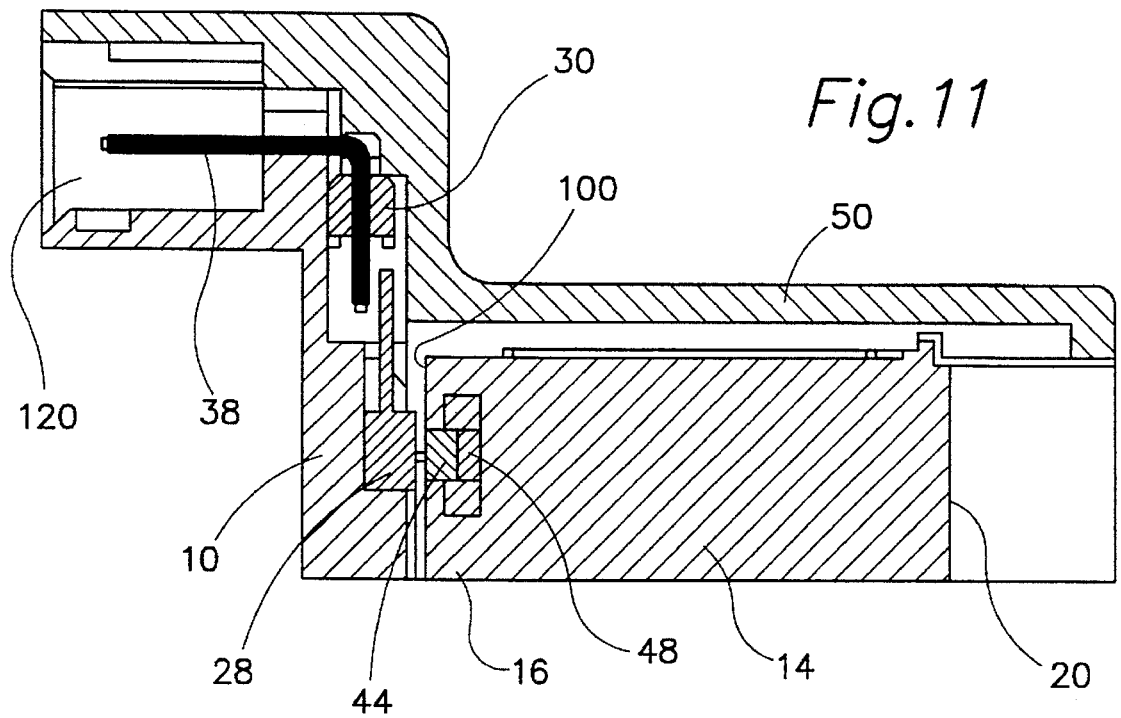
FIGS. 11 and 12 are sectional views of an accelerometer made in accordance with the present invention.
Figure 12:
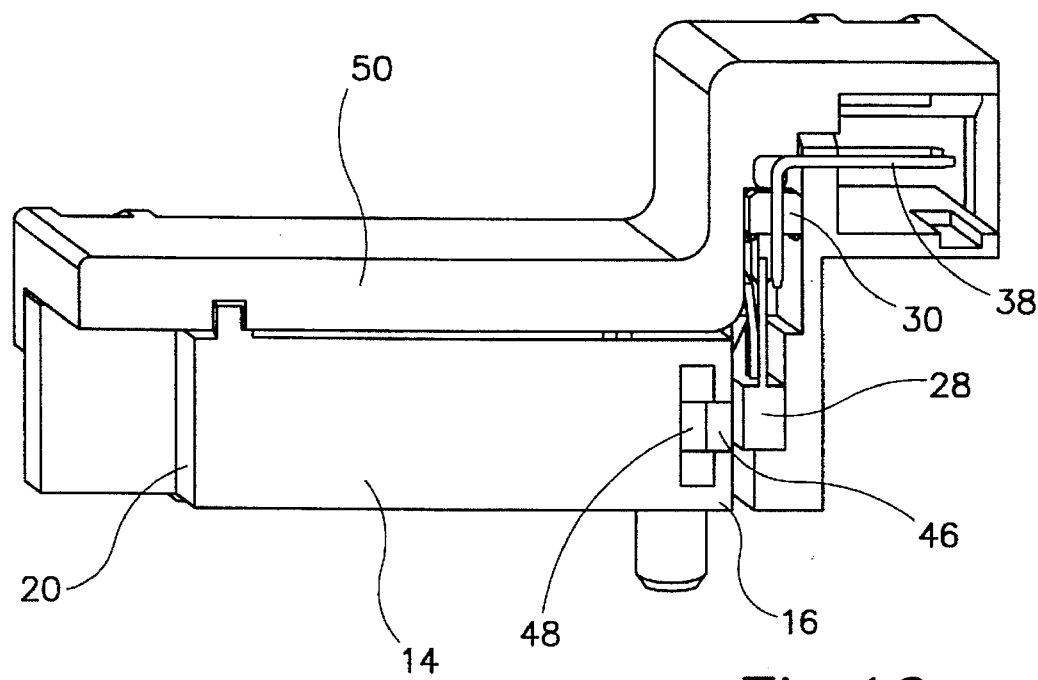

FIG. 11 is a sectioned plane view of the accelerometer made in accordance with the present invention and FIG. 12 is a sectioned perspective view of the accelerometer. With reference to FIGS. 11 and 12, it can be seen that the housing structure 10 has a cantilever beam 14 extending from a first wall 20. Within a distal end 16, a magnetic structure is encapsulated during the forming of the housing 10 and cantilever beam 14. The pole piece 48 and the magnets, 44 and 46, are encapsulated within the distal end 16. As shown in the Figures, the operative faces of the magnets is disposed within the plane 100 of the distal end 16 so that it can be exposed and remain unencapsulated by the material of which the distal end is made. This allows the magnets to be accurately disposed at a preselected distance from the magnetically sensitive component 28. In this way, the magnets can be disposed at a preselected distance from the magnetically sensitive component 28 and the distal end 16 of the cantilever beam will be free to move relative to the magnetically sensitive component 28 in response to flexure of the cantilever beam 14. It should be understood that the view shown in FIG. 11 is taken as a section of the structure along a plane in which centerline 90 is disposed. Therefore, the visible surface of the magnet 44 in FIG. 11 is the most proximate surface of magnet 44 to magnet 46 and, in addition, centerline 90 extends through that surface.

With continued reference to FIGS. 11 and 12, it can be seen that the lid structure 50 is attached to the housing structure 10 and the lead frame 30 is captured therebetween. Although not shown in FIGS. 11 and 12, the leads 38 of the lead frame are connected in electrical communication with the leads extending from the magnetically sensitive component 28. In a preferred embodiment of the present invention, this connection is accomplished by soldering. The portions of the leads 38 exposed within opening 120 allow the accelerometer to be connected to an external component through the use of a plug and socket connection.

Figure 13:
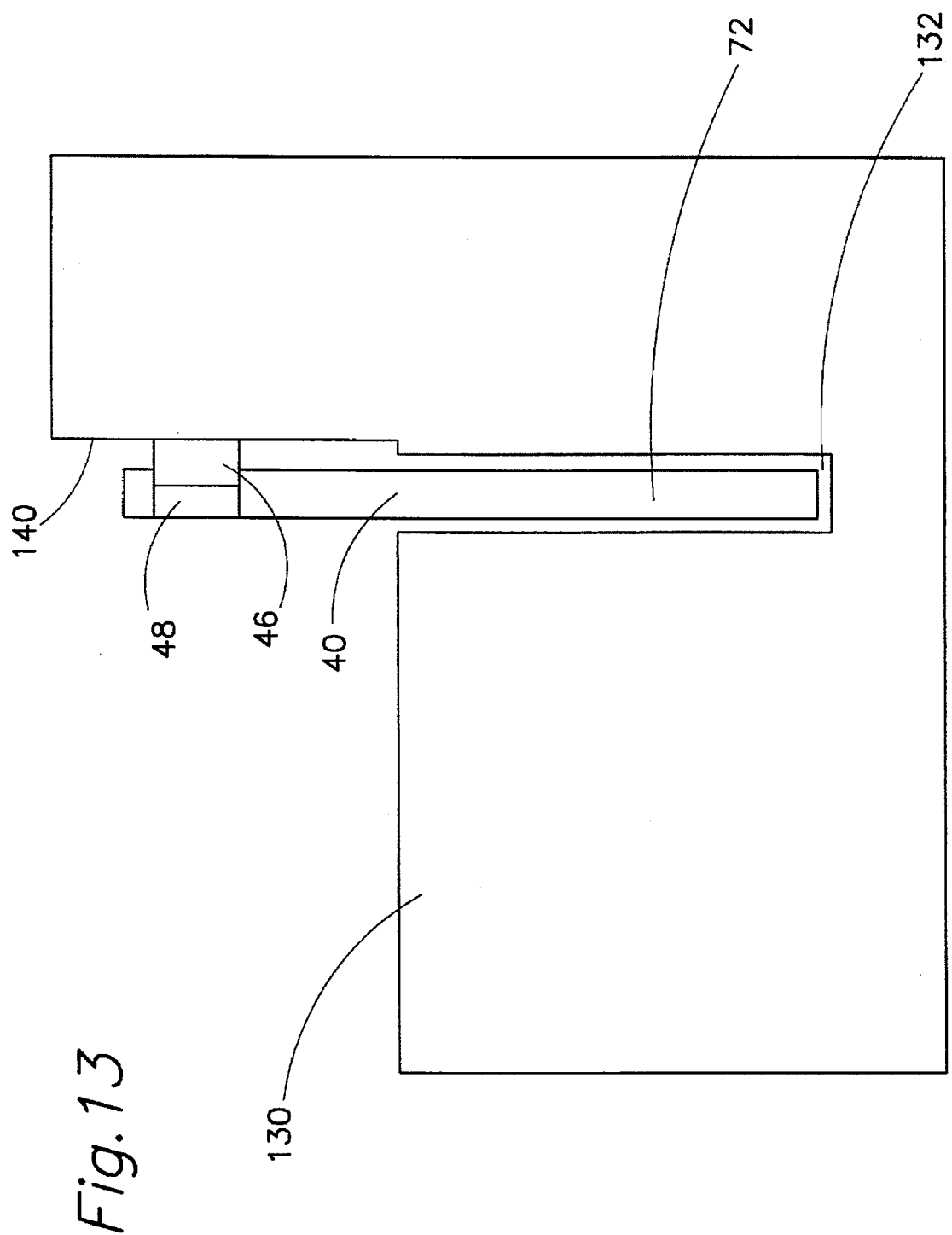
FIG. 13 shows a schematic representation of the way in which the magnets and bracket are held in position during the encapsulation molding step of the present invention.

In order to maintain the position of the magnets, the pole piece and the bracket relative to the distal end 16 of the cantilever beam 14, care must be taken during the overmolding process in which the bracket 10 is formed. FIG. 13 illustrates a schematic representation of the technique used to accurately position the magnets relative to the face 100 of the distal end 16 of the cantilever beam and leave the operative faces of the magnets exposed within the surface 100. In order to accomplish this arrangement, the injection mold structure can be appropriately configured to dispose the magnets proximate a ferromagnetic portion of the mold and thereby advantageously use the magnetic strength of the magnet to hold them in the proper position. In FIG. 13, a ferromagnetic portion 130 of an injection mold is shown in a highly schematic manner for the purpose of illustrating the basic concepts of this technique. The bracket 40 is shown being disposed within an opening 132 that is formed to receive the extension 72 of the bracket. The magnetic attraction between the magnets and a face 140 of the mold 130 holds the magnets in position and maintains the proper location of the bracket 40, the magnets and the pole piece 48 prior to and during the injection molding procedure. When the distal end 16 of the cantilever beam 14 is molded around the bracket 40, the operative face of the magnets will be accurately maintained by the magnetic attraction between the magnets and the ferromagnetic face 140 and remain exposed and unencapsulated. As described above, the bracket 40 is provided with side surfaces 65 that are shaped to prevent excessive movement, in a side to side direction, within the opening 132. The association between the sides 65 of the bracket 40 and the internal surfaces of the opening 132 is not shown in FIG. 13 because of the view that is illustrated. However, it should be clearly understood that the width of the bracket 40, as defined by the positions of the side surfaces 65, is selected to have a slight clearance fit within the opening 132 in order to accurately position the centerline 90 relative to the opening 24 that is shaped to receive the magnetically sensitive component 28 therein.

FIGS. 14 and 15 show perspective views of the present invention. In FIG. 14, the lid structure 50 is shown attached to the housing structure 10 through the use of the lugs 54 and bails 56. A single mounting hole 150 is provided in an extension portion 152 of the housing structure 10. In FIG. 15, the bottom view shows the cantilever beam 14 with its distal end 16. Also shown in the bottom surface of the distal end 16 are two legs, 160 and 162 of the bracket 40. In FIG. 15, it can also be seen that the extension portion 152 of the housing structure 10 has a bottom surface that is slightly offset from the bottom surface 170 of the remaining portion of the housing 10. This serves the purpose of raising the main structure of the accelerometer away from the surface against which the extension portion 152 is attached. This reduces the chance of distortion of the housing structure 10 when the accelerometer is attached to an external device. In addition, the locating pin 188 is provided as an extension from the bottom surface of the extension member 152.

The present invention provides an accelerometer that has a cantilever beam 14 that is formed as an integral part of a housing structure and provided with a distal end 16 in which a magnet structure is encapsulated. The magnet structure can comprise two magnets and a pole piece and the magnet structure is displaced a preselected distance from a magnetically sensitive component that is attached to a second wall of the housing structure. During an injection molding procedure, the housing structure and the cantilever beam are formed as a single step injection process and the magnet structure is encapsulated within the distal end of the cantilever beam during that process.

Figure 16:
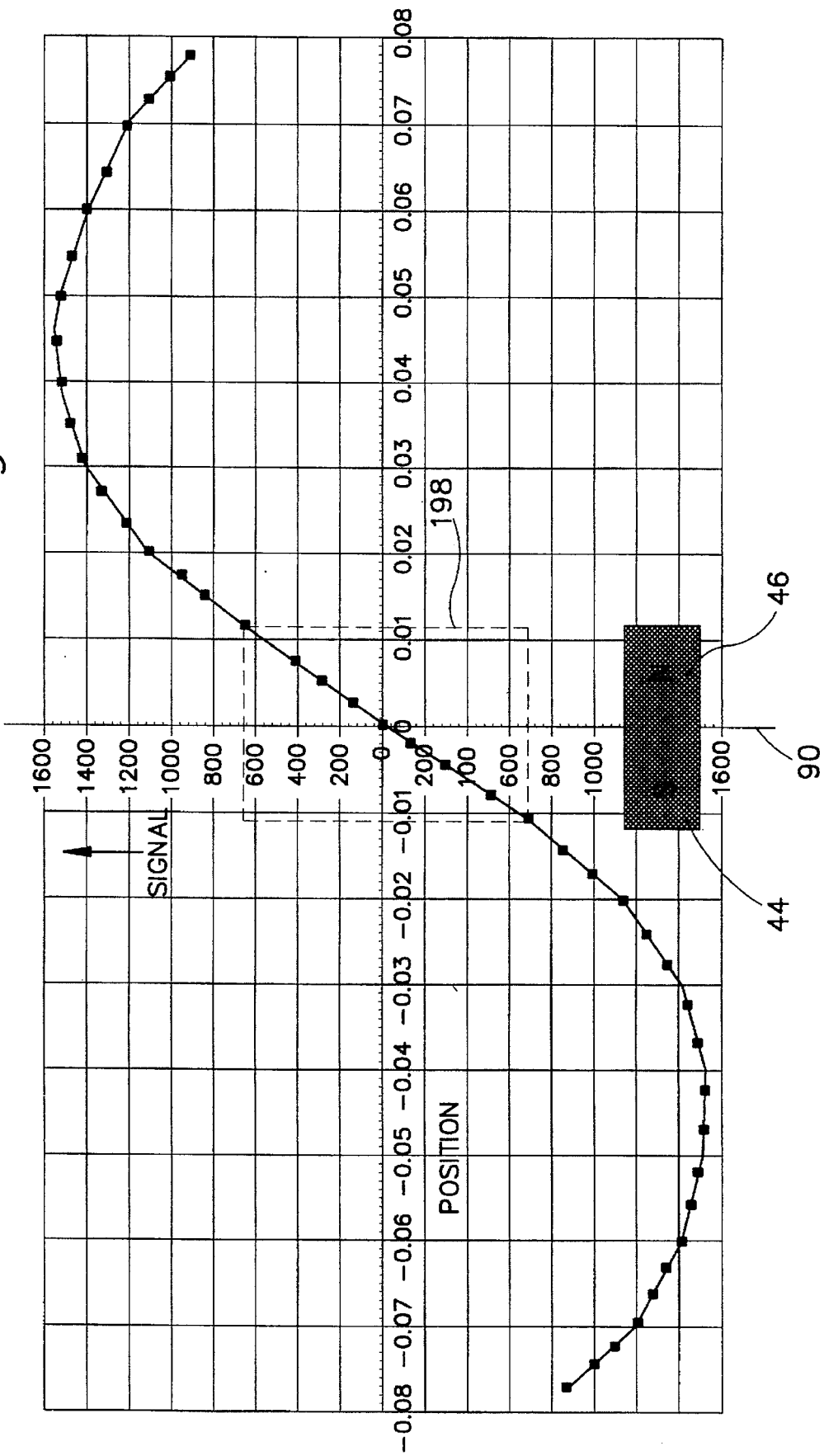
FIG. 16 is a graphical representation of the change in voltage output from the magnetically sensitive component in response to movement of the magnets with respect to a magnetically sensitive component.

FIG. 16 is a graphical representation of the relationship of an output signal from the magnetically sensitive component 28 as a function of the relative position of the centerline 90 between the two magnets and a preselected position of the magnetically sensitive component. For purposes of illustrating this relationship between the physical position of the centerline 90 and the magnitude of the output signal from the magnetically sensitive component 28, the two magnets, 44 and 46, are shown in FIG. 16 superimposed over the graph. In addition, the centerline 90 is illustrated between the two magnets. The horizontal axis in FIG. 16 represents the distance and direction of the centerline 90 with respect to the magnetically sensitive component 28, which is a Hall effect device in a most preferred embodiment of the present invention. As the distal end 16 of the cantilever beam 14 moves back and forth relative to its initial position proximate the magnetically sensitive component 28 due to flexure of the cantilever beam 14, the effect on the magnetically sensitive component 28 by the moving magnetic field provided by the magnet structure changes the output signal as shown. Within the range, represented by dashed box 198, the change in voltage output as a function of the physical position of the distal end 16 is both sensitive and relatively linear. That working area represented by dashed box 198 is approximately plus or minus 0.010 inches relative to the initial position of the centerline 90 when the cantilever beam 14 is unflexed. The signal provided as the output from the magnetically sensitive component 28 can be monitored by external devices, such as a microprocessor, in order to measure the magnitude of deflection of the cantilever beam and, as a result, the forces exerted on the housing structure 10 can be measured.

By providing a relatively inexpensive accelerometer structure, the present invention enables the use of an accelerometer in many devices in which the costs of known accelerometers would be prohibitive. For example, accelerometers made in accordance with the present invention could be used in many different types of household appliances such as washing machines.

Although the present invention has been described in considerable detail and illustrated with particular specificity to show a preferred embodiment of the present invention, it should be understood that alternative embodiments are within its scope.

The embodiments of the invention in which an exclusive property or right is claimed are defined as follows:

1. An accelerometer comprising:

a housing structure having a cavity formed therein;

a cantilever beam extending inwardly into said cavity from a first wall of said housing structure;

a magnet structure attached to a distal end of said cantilever beam, said distal end being movable along a first path in response to flexure of said cantilever beam; and a magnetically sensitive component attached to a second wall of said housing structure, said magnetically sensitive component being displaced from said magnet structure by a preselected distance, said magnetically sensitive component having an output signal which is representative of the position of said magnet structure relative to said magnetically sensitive component, said housing structure and said cantilever beam being formed as parts of a single unitary plastic structure which is produced by a single injection molding process.

2. The accelerometer of claim 1, wherein:

said magnet structure comprises two permanent magnets.

3. The accelerometer of claim 2, wherein:

said two permanent magnets are disposed within a nonmagnetic bracket.

4. The accelerometer of claim 3 wherein:

said nonmagnetic bracket is encapsulated within said distal end of said cantilever beam.

5. The accelerometer of claim 4, wherein:

said magnet structure comprises a ferromagnetic pole piece disposed in magnetic flux conducting association with said two permanent magnets.

6. The accelerometer of claim 5, wherein:

means for locating first and second permanent magnets of said two permanent magnets at first and second positions, respectively, which are equally spaced on opposite sides of a centerline, said centerline being disposed at a preselected position relative to said magnetically sensitive component.

7. The accelerometer of claim 6, wherein:

said bracket is made of brass.

8. The accelerometer of claim 7, further comprising:

a lid structure attached to said housing structure.

9. The accelerometer of claim 8, wherein:

said magnetically sensitive component comprises a Hall effect element.

10. An accelerometer comprising:

a housing structure having a cavity formed therein;

a cantilever beam extending inwardly into said cavity from a first wall of said housing structure, said housing structure and said cantilever beam being formed as parts of a unitary structure;

a magnet structure attached to a distal end of said cantilever beam, said distal end being movable along a first path in response to flexure of said cantilever beam;

a magnetically sensitive component attached to a second wall of said housing structure, said magnetically sensitive component being displaced from said magnet structure by a preselected distance, said magnetically sensitive component having an output signal which is representative of the position of said magnet structure relative to said magnetically sensitive component, said magnet structure comprising two permanent magnets, said two permanent magnets being disposed within a nonmagnetic bracket, said nonmagnetic bracket being encapsulated within said distal end of said cantilever beam, said magnet structure comprising a ferromagnetic pole piece disposed in magnetic flux conducting association with said two permanent magnets;

means for locating first and second permanent magnets of said two permanent magnets at first and second positions, respectively, which are equally spaced on opposite sides of a centerline, said centerline being disposed at a preselected position relative to said magnetically sensitive component, said bracket being made of brass and said housing structure and said cantilever beam being made of plastic, said housing structure and said cantilever beam being formed as parts of a single plastic structure which is produced by a single injection molding process; and a lid structure attached to said housing structure, said magnetically sensitive component comprising a Hall effect element.

* * * * *